United States Patent
Kesler et al.

(10) Patent No.: US 7,195,165 B2
(45) Date of Patent: Mar. 27, 2007

(54) GARMENT WITH EMBEDDED DATA

(76) Inventors: Pete Kesler, 3815 Travis Trail, Salem, VA (US) 24153; George Wright, IV, 192 Bayberry Rd., New Canaan, CT (US) 06840

( * ) Notice: Subject to any disclaimer, the term of this patent is extended or adjusted under 35 U.S.C. 154(b) by 0 days.

(21) Appl. No.: 11/122,234

(22) Filed: May 5, 2005

(65) Prior Publication Data

US 2005/0252967 A1    Nov. 17, 2005

Related U.S. Application Data

(60) Provisional application No. 60/567,773, filed on May 5, 2004.

(51) Int. Cl.
*G06K 7/10* (2006.01)
(52) U.S. Cl. .................. 235/462.01; 235/385
(58) Field of Classification Search .......... 235/462.01, 235/449, 472.02
See application file for complete search history.

(56) References Cited

U.S. PATENT DOCUMENTS 5,732,401 A * 3/1998 Conway ............... 705/29
6,225,906 B1 * 5/2001 Shore ................. 340/573.4

\* cited by examiner

*Primary Examiner*—Michael G. Lee
*Assistant Examiner*—Kristy A. Haupt
(74) *Attorney, Agent, or Firm*—Pillsbury Winthrop Shaw Pittman, LLP (57) ABSTRACT

A system and method are provided for using machine-readable technology to uniquely identify garments and to associate the garments with particular users, wherein the machine-readable technology is designed to withstand the various environments that are imposed upon a garment during its lifetime. The machine-readable technology includes identification tracking markers such as bar codes, magnetic tags, and other identification tracking markers that withstand laundering, mending, sterilizing and other processing.

21 Claims, 7 Drawing Sheets

GARMENT WITH EMBEDDED DATA

RELATED APPLICATIONS

This application claims priority to U.S. Provisional Application No. 60/567,773, filed May. 5, 2004 which is herein incorporated by reference in its entirety.

BACKGROUND

1. Field of the Invention

The invention relates to a system and method for using machine-readable technology to uniquely identify garments and to associate the uniquely identified garments with particular users.

2. Background Information

Many institutions provide employees with garments to help define a brand, create an image that is unique to the institution or to increase security by enabling the institution to clearly identify its employees, among other reasons. Under ideal conditions, the garments are maintained in inventory for several months before they become unusable and need replacement.

However, institutions find that garments are unaccounted for or otherwise are removed from the inventory before they become unusable and need replacement. Garments may be classified as unaccounted for due to a variety of reasons, including employee theft, laundry service theft, tailoring service theft, misplacement within the institution, or loss due to other reasons.

Replacing garments that are removed from inventory before they are deemed unusable adds substantial cost to providing a garment service. As a result, a system is needed that accounts for garments during their lifetime, including from a time that the garments are introduced into inventory until the garments are disposed upon becoming unusable. The system should be robust to withstand the various environments that are imposed upon a garment during its lifetime.

One known system attempted to track garments using active radio frequency identification (RFID) tags. However, the RFID tag system encountered failure during the various environments that are imposed upon a garment during its lifetime, such as the strenuous washing cycle. Various other drawbacks exist.

Other drawbacks exist with this and other known systems.

SUMMARY

Various aspects of the invention overcome at least some of these and other drawbacks of existing systems. According to one embodiment, the system employs machine readable technology to identify garments and to associate the garments with particular users. The machine readable technology may include identification tracking markers that are placed on the garments, including bar codes, magnetic tags and other identification tracking markers.

The identification tracking markers may be placed on garments to facilitate an inventory accounting of each garment. The individual garments that are uniquely identifiable using the identification tracking markers may be associated with particular users, particular departments, or other entities. Accordingly, the process of locating garments may include identifying and/or locating the particular users, particular departments, or other entities that are associated with the garment. In one embodiment of the invention, a search for desired garments may be conducted using a hierarchical process. Other types of searching may be employed.

The system may include a garment tracking module that preferably includes at least a processor, a memory, an interface and at least one input mechanism. The input mechanism may include use deployment detectors, in-use detectors, processing deployment detectors, in-process detectors and other detectors that are connected or connectable via a wired, wireless, and/or combination of wired and wireless connection.

The memory may be used to store tracking data for subsequent data processing, data recall, and other purposes. The interface may be provided to enable users to interact with the garment tracking module and to provide the display of tracking data. The interface may include a graphical user interface, a printout, an audible message and other data conveying device.

Use deployment detectors may be used to detect tracking data when garments are provided to persons for use on a temporary or other basis. In-use detectors may be used to detect tracking while the garments are being used. Processing deployment detectors may be used to detect tracking data when processing of garments is performed at a predetermined stage, such as at the beginning of use, end of use, and other stages. In-process detectors may be used to detect tracking data while garments are being processed.

The identification tracking markers may include features that withstand the various environments that are imposed upon a garment during its lifetime. In one exemplary embodiment of the invention, the bar codes may be printed using specialized thermal transfer or other inks onto a specially formulated substrate (label material), the combination of which is able to withstand the harsh environmental conditions, including temperature, humidity, the presence of high concentrations of bleach and enzymes, and other environmental conditions, while remaining intact and functional. In another embodiment of the invention, labels may be manufactured with unique bar codes that are integral with the label, such as woven, interleaved, or other integral configuration, and may be placed at the time of manufacture of the label.

According to another embodiment of the invention, garments may be tracked in real-time to enable monitoring of areas within an institution where garments are present. If the garment is determined to be in an unauthorized area or other identifiable area, an alarm or other alert may be triggered in real-time to enable some action to be taken. Alternatively, tracking data associated with garments that are determined to be in unauthorized areas or other identifiable area may be stored for later use. The tracking data may enable identification of entities associated with the garments or other information. The invention has numerous advantages over and avoids many of the drawbacks of known systems.

These and other objects, features, and advantages of the invention will be apparent through the detailed description of the embodiments and the drawings attached hereto. It is also understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below.

DETAILED DESCRIPTION

There exists a long-standing need to use machine-readable technology to uniquely identify garments and to associate the garments with particular users. Machine-readable technology may include identification tracking markers such as bar codes, magnetic tags, or other identification tracking markers. The garments may be tracked piece-by-piece, in batches, or in other configurations.

Figure 1:
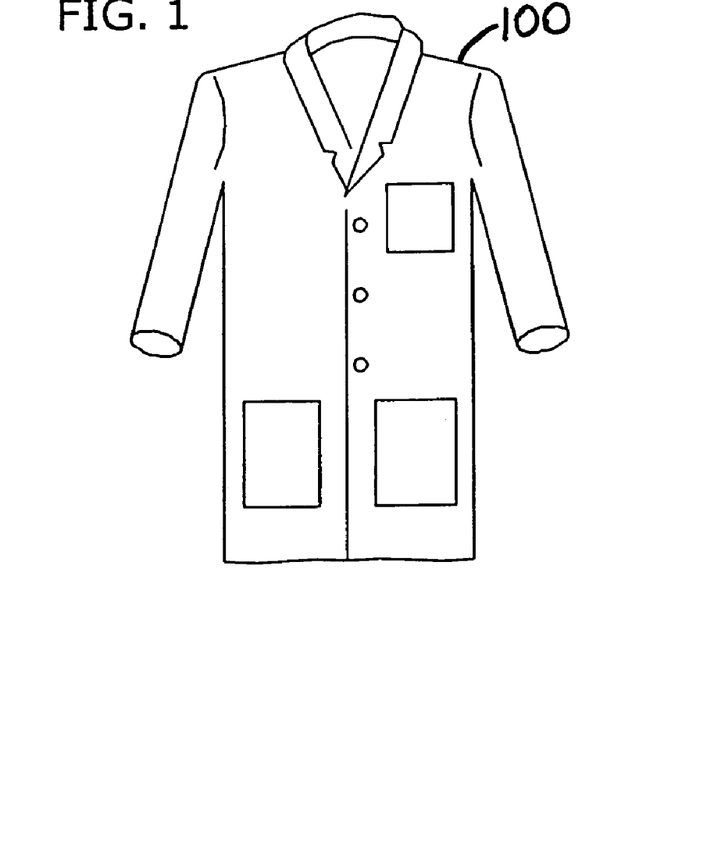
FIG. 1 illustrates an exemplary embodiment of a garment.

Various aspects of the invention may relate to a system and method for uniquely identifying garments and associating the garments with particular users. FIG. 1 illustrates an embodiment of a garment 100. Garment 100 may include hospital scrubs, a lab coat, coveralls, a smock, a uniform, or other garments. Garment 100 may be required or optional attire for persons engaged in certain activities within an institution. The institution may include a hospital, a laboratory, a business, a university, or other institutions. Garment 100 may further be provided to persons for use on a temporary basis, such as for a task or tasks, for a shift, for a day, for any other length of time, or other temporary basis. The institution may then require that garment 100 be returned to the institution.

Once worn, the institution may process garment 100 to make it suitable for re-use, before providing garment 100 to another person. Processing may include laundering, mending, sterilizing, or other processing.

According to some embodiments of the invention, the location of garment 100 may be tracked during the garments lifetime. Garment 100 may be tracked while being worn, while being processed, while being stored, and/or at other times. Tracking may include the ability to associate a uniquely identified garment 100 with particular users, particular departments, and/or other entity. The association may be established at a time the garment 100 is issued to the particular users, particular departments and/or other entity and may be updated periodically to account for movement of the garment 100.

According to one embodiment of the invention, the identification tracking markers are placed on garments 100 to facilitate an accounting of each garment 100 individually. Accordingly, although a plurality of garments 100 may include identical characteristics and may appear otherwise indistinguishable, the garments 100 may be separately identified using the identification tracking markers. In another embodiment of the invention, individual garments 100 that are uniquely identifiable using-the identification tracking markers may be associated with particular users, particular departments, and/or other entities. Accordingly, the process of locating the garments 100 may include identifying and/or locating the particular users, particular departments, and/or other entities that are associated with the garment 100. In one embodiment of the invention, searches for desired garments 100 may be conducted using hierarchical processing including tracking garments 100 to a particular institution, refining the search to a processing area within the institution and further refining the search to a more particular location within the processing area. Other types of hierarchical processing may be employed. In another embodiment of the invention, searches for desired garments 100 may be conducted using non-hierarchical processing. While particular embodiments are provided herein, it will be understood by one of ordinary skill in the art that different searching techniques may be employed to locate desired garments 100.

According to one embodiment of the invention, garments 100 may be tracked before, during, and/or after use; before, during, and/or after processing; and/or at another time. In an exemplary embodiment, tracking may implemented using application-specific software and readers, among other techniques.

Tracking may be used to establish accountability, responsibility, mobility, ownership, and/or other tracking purposes, for the garments 100 at various points in the garments lifetime. Tracking may reduce and/or prevent incidents of lost garments, stolen garments, misplaced garments, unauthorized use of garments, and/or other incidents associated with garments 100.

Figure 2:
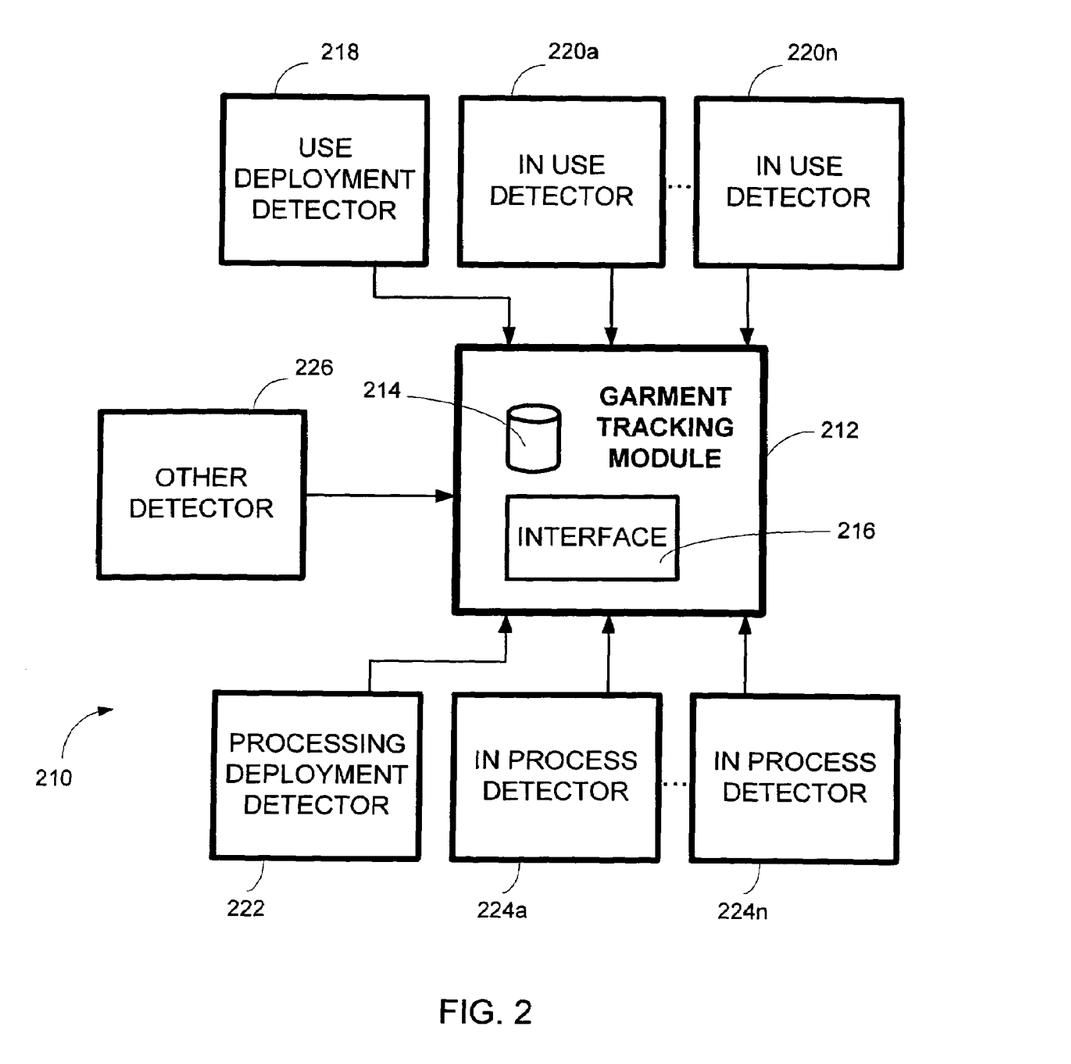
FIG. 2 illustrates a garment tracking system according to an exemplary embodiment of the invention.

FIG. 2 illustrates an embodiment of a garment tracking system 210 for tracking garment 100. Garment tracking system 210 may include a garment tracking module 212. Garment tracking module 212 may include a memory or tracking data storage 214. Tracking data storage 214 may store tracking data that may include an inventory of garments and corresponding identification tracking markers, garment location data, institution data, user data, or other data. It will be appreciated that while tracking data storage 214 is illustrated as a single entity, tracking data storage 214 may include one or more data storage mediums, or a combination of data storage mediums, such as one or more electronic databases, one or more paper records, or other data storage mediums.

In some embodiments of the invention, garment tracking module 212 may include a garment tracking interface 216. Garment tracking interface 216 may convey tracking data. The tracking data may be conveyed through a graphical user interface, a printout, an audible message, or other data conveying device. The tracking data conveyed by garment tracking interface 216 may be stored in tracking data storage 214. Garment tracking interface 216 may further enable manipulation of tracking data, such as the tracking data stored in tracking data storage 214, or other tracking data. It will be appreciated that although garment tracking interface 216 is illustrated as a single interface, more than one interface may be provided. This may enable more than one user to concurrently access the tracking data.

Although garment tracking module 212 is shown as a single element, it will be appreciated that this embodiment is for illustrative purposes only. Alternatively, garment tracking module 212 may include one or more modules and/or sub-modules operating from a single location, or operating remotely from a plurality of locations.

According to various embodiments, garment tracking system 210 may include a use deployment detector 218. Use deployment detector 218 may be used to detect tracking data when garment 100 is provided to persons for use on a temporary or other basis. The tracking data detected by use deployment detector 218 may include deployment date data, deployment time data, user data, garment identification data associated with garment 100, return date data, return time data, institute identification data, or other tracking data. Use deployment detector 218 may be operatively connected to garment tracking module 212, and may provide tracking data to tracking data storage 214. In an exemplary embodiment of the invention, use deployment detector 218 may communicate with the garment tracking module 212 over a wireless or wired medium.

In some embodiments, garment tracking system 210 may include one or more in-use detectors 220 (220a–220n). In-use detector 220 may detect tracking data while garment 100 is being used. The tracking data detected by in-use detector 220 may include garment location data, garment identification data associated with garment 100, date data, time data, institution data, or other tracking data. In-use detector 220 may be operatively linked to garment tracking module 212 and may provide tracking data to tracking data storage 214. In an exemplary embodiment, in-use detector 220 may communicate with the garment tracking module 212 over a wireless or wired medium.

According to various embodiments of the invention, garment tracking system 210 may include a processing deployment detector 222. Processing deployment detector 222 may be used to detect tracking data when processing of garment 100 is at a predetermined stage, such as at the beginning of use, end of use, or other stages. The tracking data detected by processing deployment detector 222 may include processing data, deployment date data, deployment time data, garment identification data associated with garment 100, return date data, return time data, institute identification data, or other tracking data.

Processing deployment detector 222 may be operatively connected to garment tracking module 212 and may provide tracking data to tracking data storage 214. In an exemplary embodiment, processing deployment detector 222 may communicate with the garment tracking module 212 over a wireless or wired medium.

According to some embodiments, garment tracking system 210 may include one or more in-process detectors 224. In-process detector 224 may detect tracking data while garment 100 is being processed. The tracking data detected by in-process detector 224 may include process data, process stage data, garment location data, garment identification data associated with garment 100, date data, time data, institution data, or other tracking data. In-process detector 224 may be operatively linked to garment tracking module 212 and may provide tracking data to tracking data storage 214. In an exemplary embodiment, in-process detector 224 may communicate with the garment tracking module 212 over a wireless or wired medium.

According to various embodiments, garment tracking system 210 may include one or more other detectors 226. Other detector 226 may be used to detect tracking data related to garment 100 when garment 100 is not be used or processed. The tracking data detected by other detector 226 may include, garment location data, garment identification data for garment 100, date data, time data, institution data, or other tracking data. In an exemplary embodiment, other detectors 226 may communicate with the garment tracking module 212 over a wireless or wired medium.

In some embodiments of the invention, garment tracking system 210 may be used to track garment 100 during use and/or while being processed. Tracking data associated with garment 100 may be generated, stored, and/or conveyed in order to monitor parameters associated with garment 100. In an exemplary embodiment of the invention, garment tracking system 210 may detect the person using garment 100, the location of garment 100, the processing status of garment 100, the real time processing stage of garment 100, or other information related to garment 100. Garment tracking system 210 may also provide a history of garment 100 to determine when the garment was last detected by garment tracking system 210 and provide other historical information. The history may provide benefits to the institution, such as, aid in finding garment 100 if it becomes lost, aid in holding a party or parties accountable for garment 100 if it becomes lost, or some other benefit.

Figure 3:
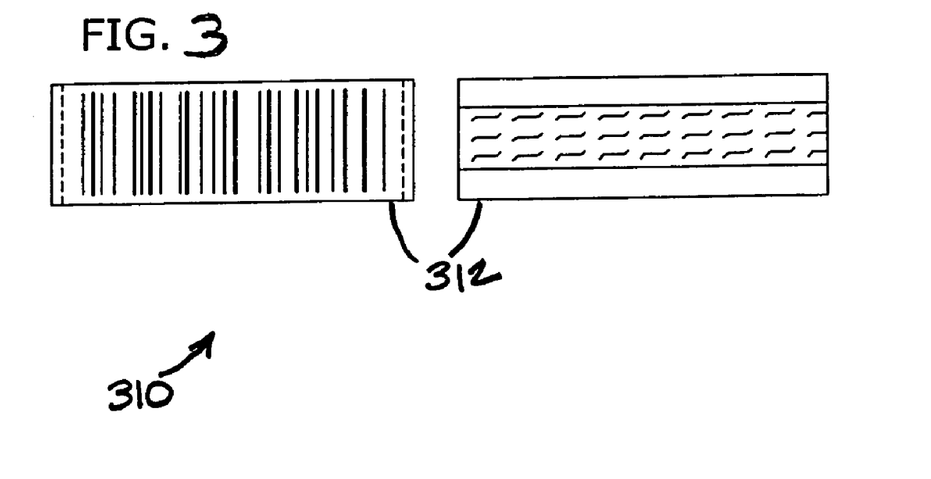
FIG. 3 illustrates an identification tracking marker according to an exemplary embodiment of the invention.

According to various embodiments of the invention, garment 100 may be provided with machine-readable identification tracking marker. FIG. 3 illustrates an exemplary embodiment of machine-readable identification tracking markers 310. Identification tracking marker 310 may include one or more identifiers 312. In one exemplary embodiment, identifier 312 may include an optical identifier, such as a bar code or other optical code configuration. In another embodiment of the invention, the optical identifier may include a two-dimensional bar code. In yet another exemplary embodiment, identifier 312 may include a magnetic identifier, such as a binary magnetic medium or other magnetic medium. Identifier 312 may include tracking data regarding garment 100, such as, garment identification data, garment age data, institution data, or other tracking data.

One exemplary embodiment may include optical identifiers having bar codes, specifically, high-capacity 2-dimensional (2D) bar codes that are placed on a label (such as a care label) that is attached to garment 100. The optical identifiers may be designed to withstand the various environments that are imposed upon a garment during its lifetime. In one exemplary embodiment of the invention, the bar codes may be printed using specialized thermal transfer or other inks onto a specially formulated substrate (label material), the combination of which is able to withstand the harsh environmental conditions, including temperature, humidity, the presence of high concentrations of bleach and enzymes, and other environmental conditions, while remaining intact and functional. Intact and functional includes being readily scannable by the system's bar code scanners.

According to one embodiment of the invention, the bar codes may be proprietary in design or off the shelf; may encode unique item identification information literally or in an encrypted manner; and/or may be printed with inks visible or invisible to the naked eye. The labels on which the bar codes are printed my contain visible or invisible, or otherwise hard-to-detect physical features, including taggants, watermarks or other features. In another embodiment, the bar codes may be attached using sew on techniques, heat seal techniques or other attaching techniques.

In yet another embodiment of the invention, labels may be manufactured with unique bar codes that are integral with the label, such as woven, interleaved, or other integral configuration, and may be placed at the time of manufacture of the label. According to one exemplary embodiment, the optical identifiers may be uniquely identify each garment 100. In another embodiment of the invention, the optical identifiers may employ proprietary configurations. In an exemplary embodiment of the invention, the bar code may be scanned using known scanner technology and may be processed via a software application.

Another exemplary embodiment of the invention may include using magnetic identifiers that employ magnetic identification. In one embodiment of the invention, the magnetic identifiers may employ proprietary signals.

In some embodiments, tracking data included in identifier 312 may be encrypted. Encryption enables proprietary access to tracking data. Access may be granted when a known identifier is provided. Further, an encryption key may be used to encrypt the tracking data, wherein the encryption key may be specific to an institution. Therefore, an institution having an encrypted identifier associated with garment 100 may be afforded the security that tracking data included in identifier 312 will only be accessible by that institution because other parties will not be able to de-encrypt the tracking data.

Referring back to FIG. 2, identification tracking marker 310 may include one or more identifiers 312 such that identifiers 312 may include tracking data associated with garment 100, wherein identifiers 312 may be detected by one or more of use deployment detectors 218, in-use detectors 220, processing deployment detectors 222, in-process detectors 224, and/or other detectors 226. This may enable detected tracking data associated with garment 100 to be provided to garment tracking module 212.

Figure 4:
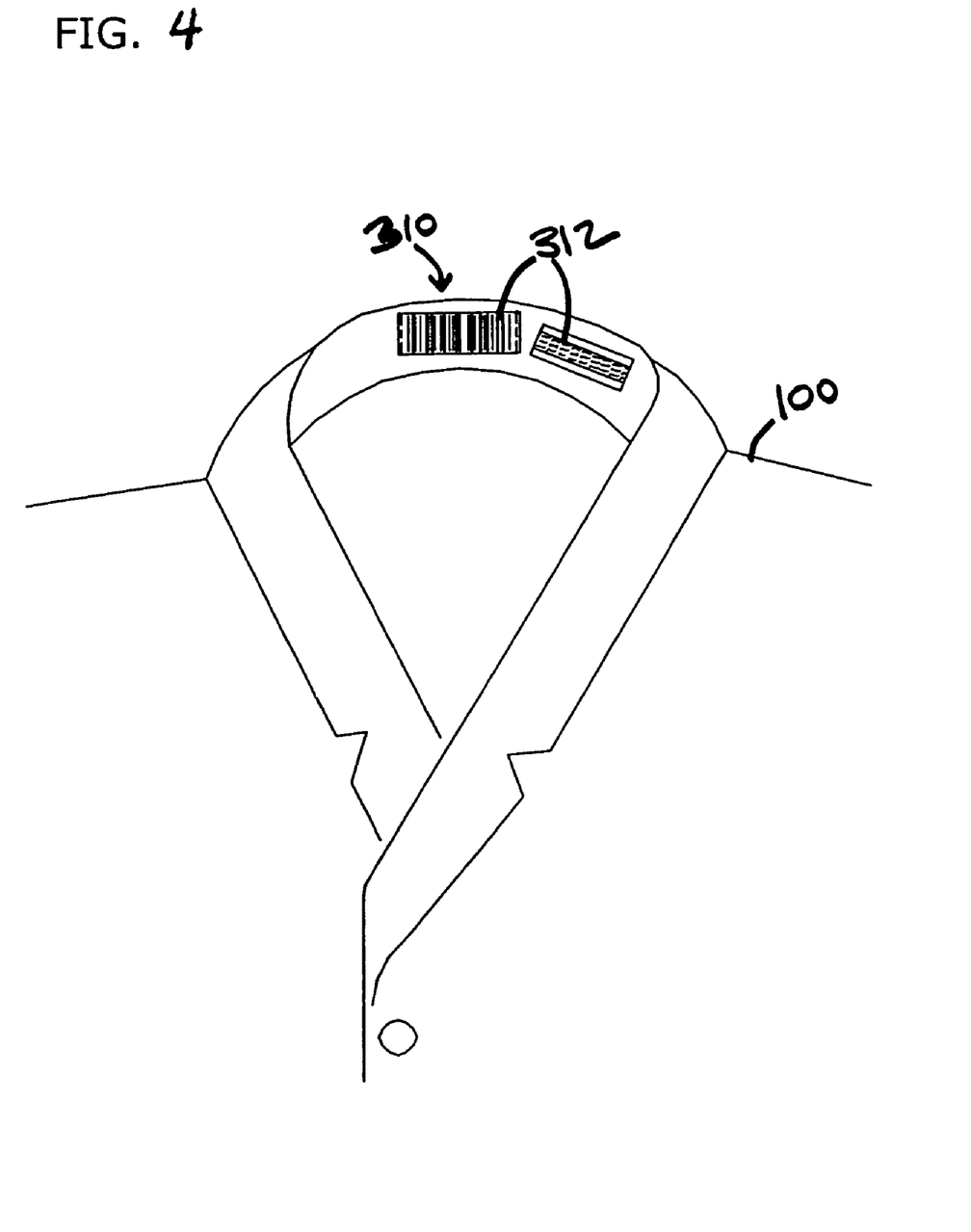
FIG. 4 illustrates a garment having an identification tracking marker thereon according to an exemplary embodiment of the invention.

FIG. 4 illustrates an exemplary embodiment of identification tracking marker 310 provided on garment 100. It will be appreciated that the embodiment of FIG. 4 has been provided for illustrative purposes only and that identification tracking marker 310 may be provided at any location on garment 100, such as inside a collar, on a cuff, on a pocket, or other locations. Identification tracking marker 310 may be provided to garment 100 at manufacture or may be provided sometime thereafter, independent of the manufacturing process.

Figure 5:
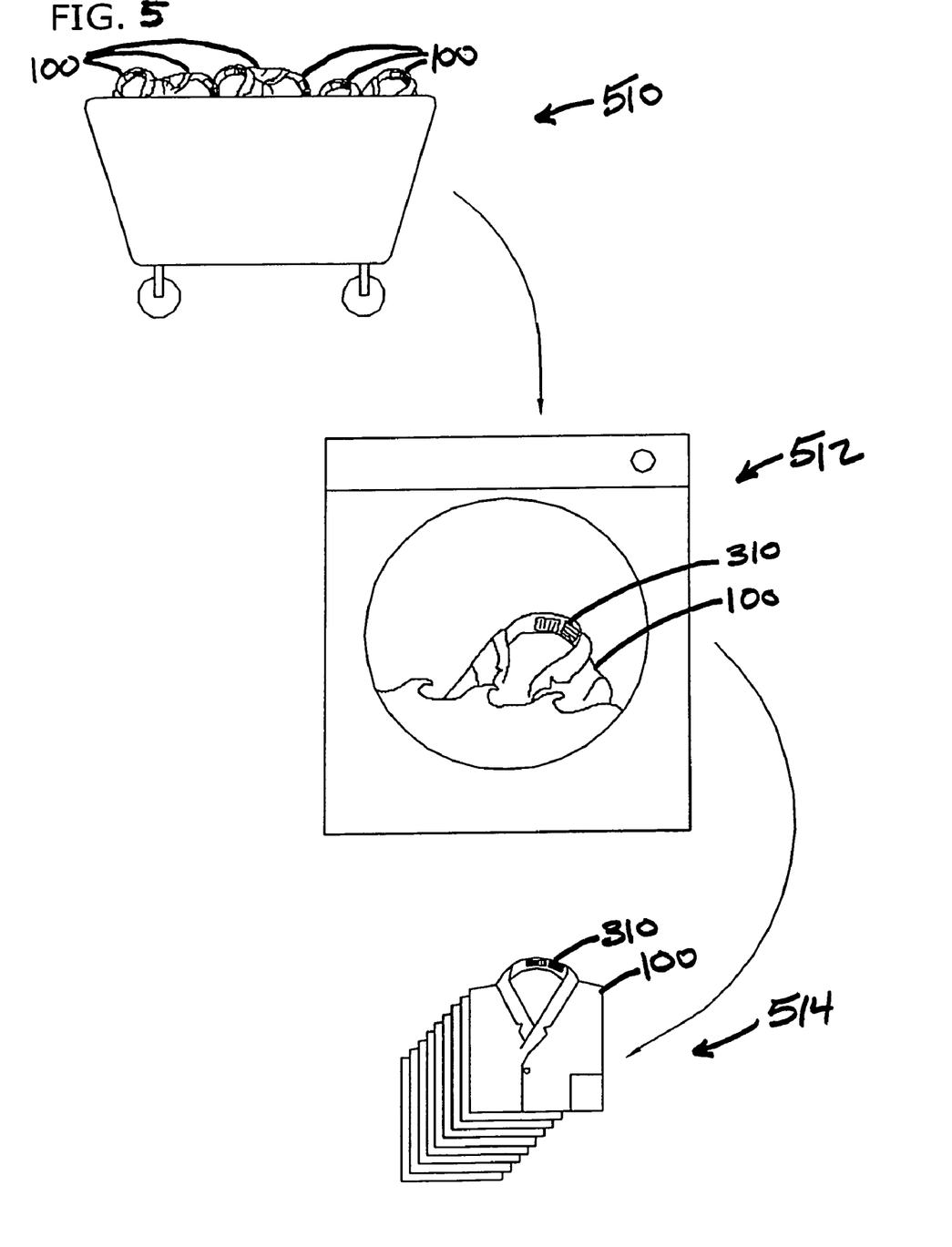
FIG. 5 illustrates a garment processing station according to an exemplary embodiment of the invention.

FIG. 5 illustrates an exemplary embodiment of the invention wherein garment 100, including tracking marker 310, may be processed using various processing stages. Garment 100 may first be processed in an initial process stage 510. In initial process stage 510, garment 100 may be transported to a processing location. In an intermediate processing stage 512, garment 100 may undergo processing, wherein processing may include preparation for use or other processing. In a final processing stage 514, the processing of garment 100 may be completed and garment 100 may be prepared for use. Throughout the process, tracking data associated with garment 100 may be detected by detectors, such as processing deployment detector 222, in-process detector 224, or other detectors. The tracking data may be provided to garment tracking module 212 or may be provided to other systems.

Figure 6:
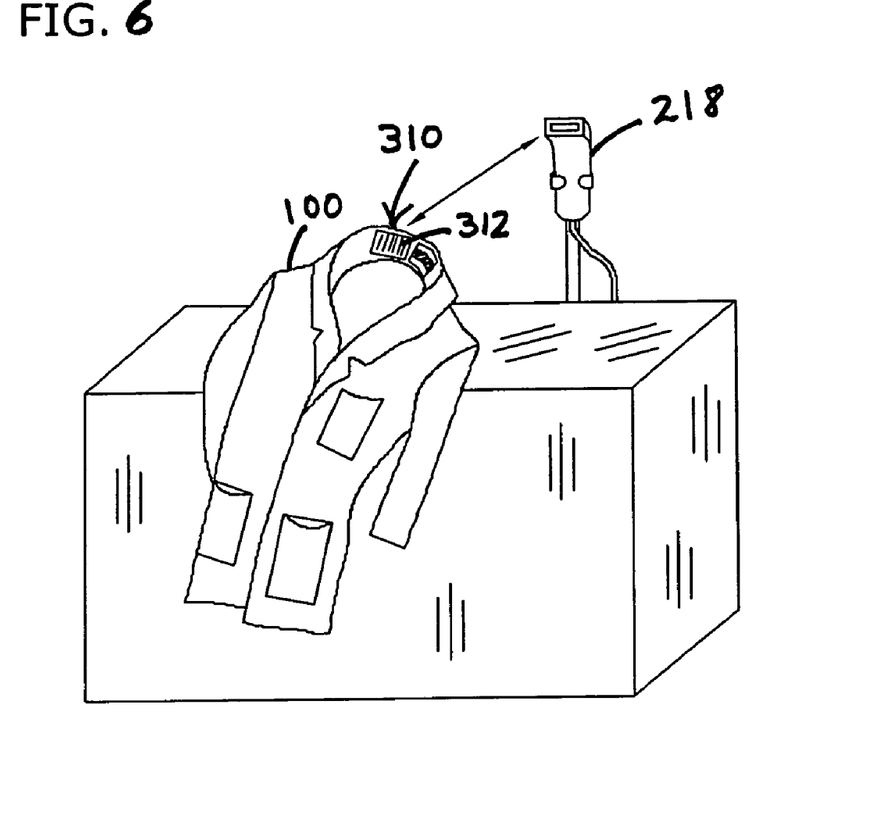
FIG. 6 illustrates a garment tracking device according to a first exemplary embodiment of the invention.

FIG. 6 illustrates an exemplary embodiment using the use deployment detector 218. Use deployment detector 218 may be an optical scanner and identifier 312 may be an optical identifier. Use deployment detector 218 may be enabled to detect tracking data associated with garment 100 and included in identifier 312 of identification tracking marker 310. Tracking data detected by use deployment detector 218 may be associated with additional tracking data, such as whether garment 100 is being issued for use or returned from use, an identity of a party or parties that garment 100 is being issued to or returned by, a location that garment 100 is being issued to or returned from, a date that garment 100 is being issued or returned on, a time that garment 100 is being issued or returned at, or other tracking data. Tracking data detected by use deployment detector 218 and any additional tracking data may be provided to garment tracking module 212. The tracking data may be accessed in real-time or may be stored in tracking data storage 214 for retrieval at a future time.

Figure 7:
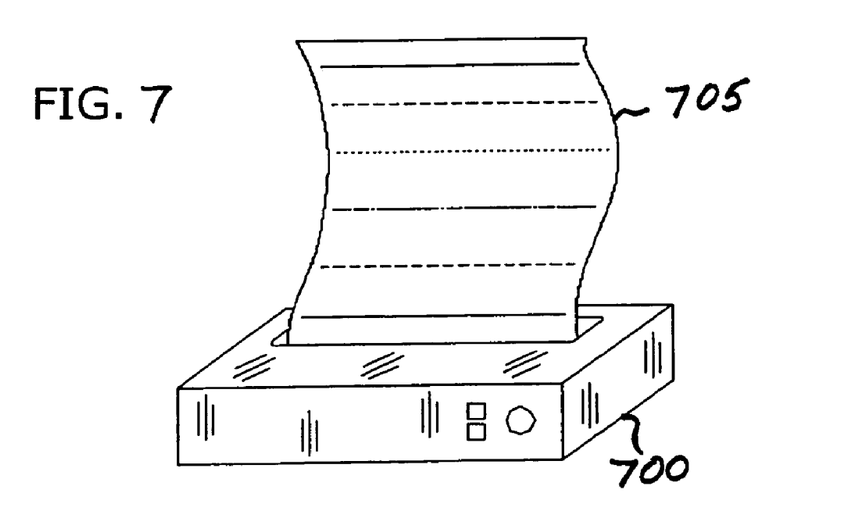
FIG. 7 illustrates a tracking data output device according to an exemplary embodiment of the invention.

FIG. 7 illustrates an output device 700 that provides a printout 705 of tracking data associated with scanned garments 100. It will be appreciated that while a printout 705 of the tracking data is illustrated in FIG. 7, the tracking data also may be conveyed through a graphical user interface, a printout, an audible message, or other data conveying device. A combination of conveying devices also is contemplated.

Figure 8:
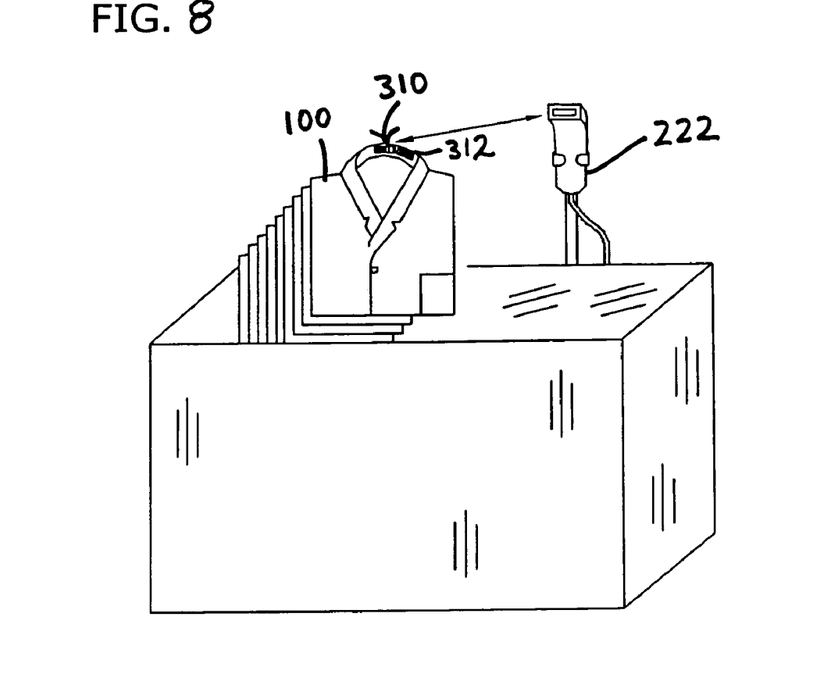
FIG. 8 illustrates a garment tracking device according to a second exemplary embodiment of the invention.

FIG. 8 illustrates an exemplary embodiment having a processing deployment detector 222. Processing deployment detector 222 may be an optical scanner and identifier 312 may be an optical identifier. Processing deployment detector 222 may be enabled to detect tracking data regarding garment 100 contained by identifier 312 of identification tracking marker 310. Tracking data detected by processing deployment detector 222 may be associated with additional tracking data, such as, whether garment 100 is being issued for processing or returned from processing, an identity of a party or parties that garment 100 is being issued to or returned by, a location that garment 100 is being issued or returned at, a date that garment 100 is being issued or returned on, a time that garment 100 is being issued or returned at, or other tracking data. Tracking data detected by processing deployment detector 222 and the additional tracking data may then be provided to garment tracking module 212 and may be stored in tracking data storage 214 for real-time user or for retrieval at a future time.

Figure 9:
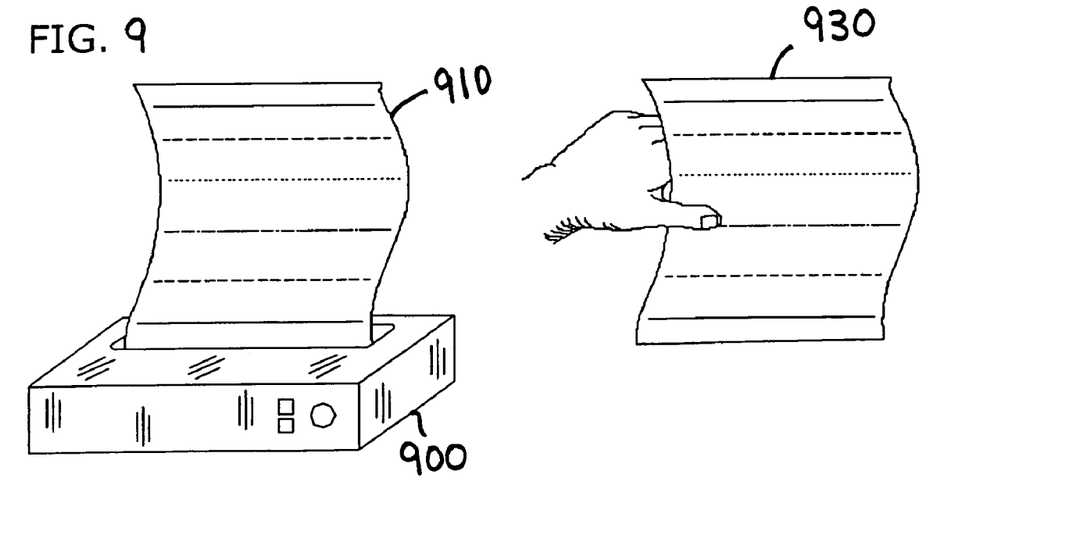
FIG. 9 illustrates a tracking data output device according to second exemplary embodiment of the invention.

FIG. 9 illustrates an output device 900 that provides a printout 910 of tracking data associated with scanned garments 100. It will be appreciated that while a printout 910 of the tracking data is illustrated in FIG. 9, the tracking data also may be conveyed through a graphical user interface, a printout, an audible message, or other data conveying device. A combination of conveying devices is also contemplated. The printout 910 of tracking data may be compared to a previously prepared printout 930 for the same batch of scanned garments 100 to derive information from printout 910 and printout 930. The information may include information about an identity of garments 100 that are missing, an indication of garments 100 that were processed, information regarding the length of time that passed between when the garments 100 were first scanned and when they were scanned next, or other information.

Figure 10:
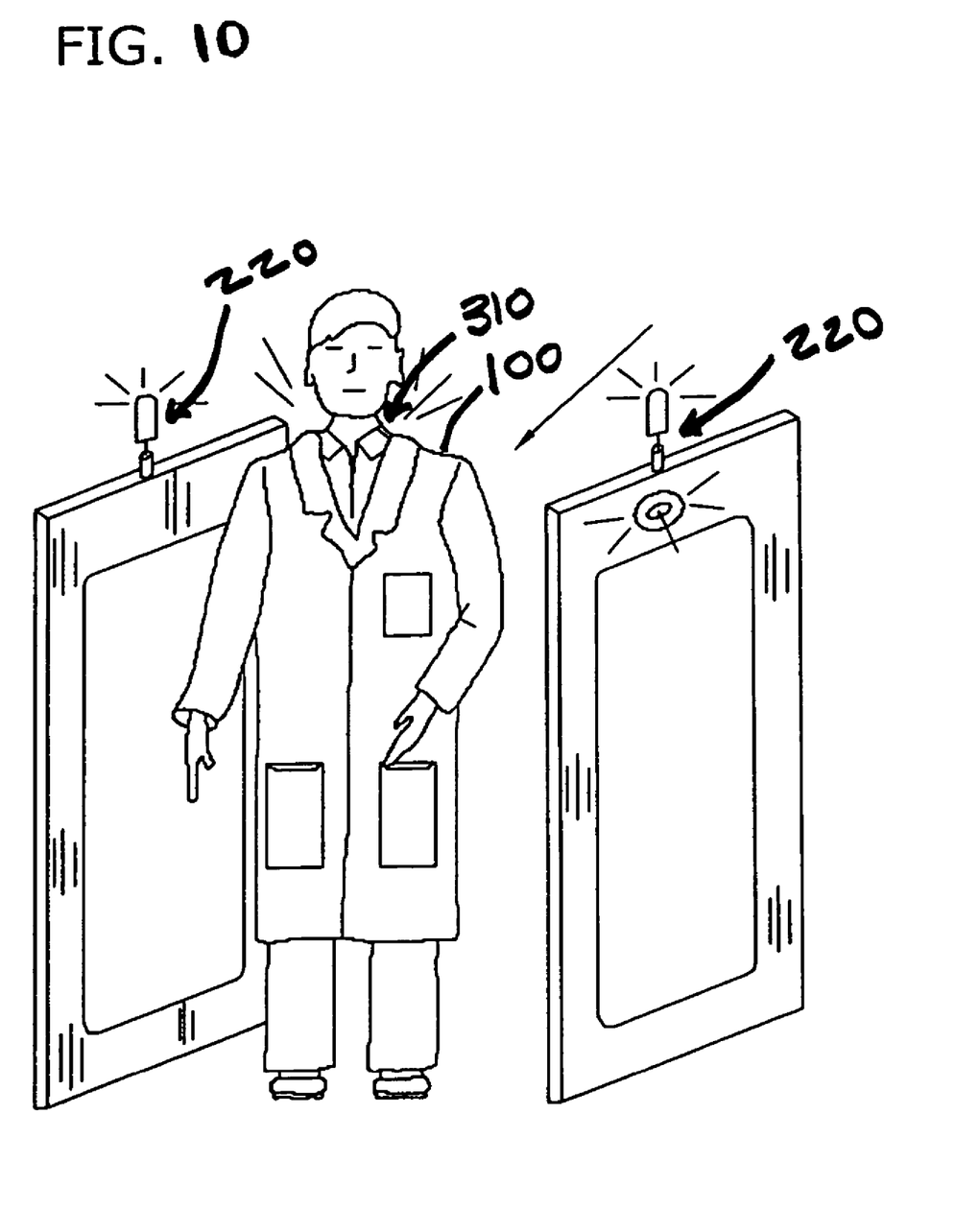
FIG. 10 illustrates an in-use detector device according to an exemplary embodiment of the invention.

FIG. 10 illustrates an exemplary embodiment having an in-use detector 220. In-use detector 220 may be an magnetic detector and identifier 312 may be an magnetic identifier. In-use detector 220 may detect tracking data contained in identifier 312 of identification tracking marker 310 regarding garment 100. Tracking data detected by in-use detector 220 may be associated with additional tracking data, such as, a date of detection, a time of detection, a detection location, or other tracking data. The combined tracking data may then be provided to garment tracking module 212 in real-time and/or may be stored in tracking data storage 214 for later retrieval. The tracking data detected by in-use detector 220 and the additional tracking data may enable the location of garment 100 to be tracked throughout the usage of garment 100.

The real-time tracking of garments 100 may enable monitoring of areas within the institution where the garment 100 is taken. If the garment 100 is determined to be in an unauthorized area or other identifiable area, an alarm or other alert may be triggered in real-time to enable some action to be taken. Alternatively, tracking data associated with garment 100 that is determined to be in an unauthorized area or other identifiable area may be stored for later use. The tracking data may enable identification of entities associated with the garment 100 or other information.

While the preferred forms of the invention have been disclosed, it will be apparent to those skilled in the art that various changes and modifications may be made that will achieve some of the advantages of the invention without departing from the spirit and scope of the invention. For example, while tracking of garments is describe herein, it will be apparent to those skilled in the art that other items may be tracked. It will be apparent to those reasonably skilled in the art that other components performing the same function may be suitably substituted. Further, the methods of the invention may be achieved in either all software implementations, using the appropriate processor instructions, or in hybrid implementations that utilize a combination of hardware logic and software logic to achieve the same results. Therefore, the scope of the invention is to be determined solely by the claims to be appended.

What is claimed is:

1. A system for identifying garments that include identification tracking markers located thereon the system comprising:
   a detector that is configured to read the identification tracking markers;
   a garment tracking module that is coupled to the detector for receiving an electronic signal representing the identification tracking markers;
   a memory that includes at least an inventory of the garments, corresponding identification tracking markers, and corresponding tracking data history, wherein the tracking data history includes at least a history of users, locations, dates of use, and durations of use for each garment; and
   a processor that is configured to;
      receive the electronic signal, associate the electronic signal with a selected garment from the inventory of garments,
      generate tracking data associated with the selected garment, and
      store the generated tracking data in the memory.

2. The system according to claim 1, wherein the garments include at least one of hospital scrubs, lab coats, coveralls, smocks, and uniforms.

3. The system according to claim 1, wherein the identification tracking markers include at least one of optically readable markers and magnetically readable markers.

4. The system according to claim 3, wherein the optically readable markers include bar codes.

5. The system according to claim 1, wherein the detector includes at least one of use deployment detectors, in-use detectors, processing deployment detectors, and in-process detectors.

6. The system according to claim 1, wherein the processor employs hierarchical processing to associate the selected entity with the selected garment.

7. The system according to claim 1, wherein the garment tracking module receives the electronic signal in real-time.

8. The system according to claim 1, wherein the processor is configured to generate and store the tracking data for a corresponding garment in real-time.

9. The system according to claim 1, wherein the identification tracking markers include at least one optically readable marker printed using a combination of thermal transfer ink and a formulated substrate.

10. A method of identifying garments that include identification tracking markers located thereon, the method comprising:
    reading the identification tracking markers;
    receiving an electronic signal representing the identification tracking markers;
    accessing a memory that includes at least an inventory of the garments, corresponding identification tracking markers, and corresponding tracking data history, wherein the tracking data history includes at least a history users, locations, dates of use, and durations of use for each garment;
    associating the electronic signal with a selected garment from the inventory of garments;
    generating tracking data associated with the selected garment; and
    storing the generated tracking data in the memory.

11. The method according to claim 10, wherein the garments include at least one of hospital scrubs, lab coats, coveralls, smocks, and uniforms.

12. The method according to claim 10, wherein the identification tracking markers include at least one of optically readable markers and magnetically readable markers.

13. The method according to claim 12, wherein the optically readable markers include bar codes.

14. The method according to claim 10, wherein selecting the entity that corresponds to the selected garment is performed using hierarchical processing.

15. The method according to claim 10, wherein the electronic signal is received in real-time.

16. The method according to claim 10, wherein the tracking data is generated and stored in real-time.

17. The method according to claim 10, wherein the identification tracking markers include at least one optically readable marker printed using a combination of thermal transfer ink and a formulated substrate.

18. A system for identifying garments that include identification tracking markers located thereon and monitoring areas within an institution where the garments are located, the system comprising:
    a detector that is configured to read the identification tracking markers;
    a garment tracking module that is coupled to the detector for receiving an electronic signal representing the identification tracking markers;
    a memory that includes at least an inventory of the garments, corresponding identification tracking markers, and corresponding tracking data history, wherein the tracking data history includes at least a history of users, locations, dates of use, and durations of use for each garment;
    a processor that is configured to receive the electronic signal and associate the electronic signal with a selected garment from the inventory of garments; and
    an alert generator that is configured to issue an alert when the selected garment is located in an unauthorized zone.

19. The system according to claim 18, wherein the garment tracking module receives the electronic signal in real-time.

20. The system according to claim 18, wherein the detector includes at least one of use deployment detectors, in-use detectors, processing deployment detectors, an in-process detectors.

21. The system according to claim 18, wherein the identification tracking markers include at least one optically readable marker printed using a combination of thermal transfer ink and a formulated substrate.

* * * * *